(12) United States Patent
Reynolds et al.

(10) Patent No.: US 8,409,541 B2
(45) Date of Patent: Apr. 2, 2013

(54) PROCESS FOR PRODUCING A COPPER THIOMETALLATE OR A SELENOMETALLATE MATERIAL

(75) Inventors: Michael Anthony Reynolds, Katy, TX (US); Stanley Nemec Milam, Houston, TX (US)

(73) Assignee: Shell Oil Company, Houston, TX (US)

( * ) Notice: Subject to any disclaimer, the term of this patent is extended or adjusted under 35 U.S.C. 154(b) by 134 days.

(21) Appl. No.: 13/010,890

(22) Filed: Jan. 21, 2011

(65) Prior Publication Data

US 2011/0176990 A1 Jul. 21, 2011

Related U.S. Application Data

(60) Provisional application No. 61/297,054, filed on Jan. 21, 2010.

(51) Int. Cl.
*C01B 17/00* (2006.01)
*C01B 19/00* (2006.01)
*C01B 17/46* (2006.01)

(52) U.S. Cl. .......................... 423/511; 423/508; 423/517

(58) Field of Classification Search .................. None
See application file for complete search history.

(56) References Cited

U.S. PATENT DOCUMENTS

| | | | |
|---|---|---|---|
| 3,458,433 A | 7/1969 | Wood et al. ............ 208/89 |
| 3,904,513 A | 9/1975 | Fischer et al. ............ 208/264 |
| 4,208,271 A | 6/1980 | Cosyns et al. ............ 208/255 |
| 4,243,553 A | 1/1981 | Naumann et al. ............ 252/439 |
| 4,243,554 A | 1/1981 | Naumann et al. ............ 252/439 |
| 4,424,142 A | 1/1984 | Asaoka et al. ............ 502/84 |
| 4,425,278 A | 1/1984 | Wirth et al. ............ 260/429 R |
| 4,454,024 A | 6/1984 | Singhal et al. ............ 208/111 |
| 4,510,260 A | 4/1985 | Stiefel et al. ............ 502/219 |
| 4,514,517 A | 4/1985 | Ho et al. ............ 502/220 |
| 4,547,321 A | 10/1985 | Stiefel et al. ............ 556/14 |
| 4,557,821 A | 12/1985 | Lopez et al. ............ 208/108 |
| 4,581,125 A | 4/1986 | Stiefel et al. ............ 208/108 |
| 4,596,785 A | 6/1986 | Toulhoat et al. ............ 502/220 |
| 4,626,339 A | 12/1986 | Chianelli et al. ............ 208/18 |
| 4,632,747 A | 12/1986 | Ho et al. ............ 208/18 |
| 4,650,563 A | 3/1987 | Jacobson et al. ............ 208/108 |
| 4,666,878 A | 5/1987 | Jacobson et al. ............ 502/221 |
| 4,668,376 A | 5/1987 | Young et al. ............ 208/108 |
| 4,695,369 A | 9/1987 | Garg et al. ............ 208/112 |
| 4,698,145 A | 10/1987 | Ho et al. ............ 208/18 |
| 4,721,558 A | 1/1988 | Jacobson et al. ............ 208/108 |
| 4,724,068 A | 2/1988 | Stapp ............ 208/213 |
| 4,748,142 A | 5/1988 | Chianelli et al. ............ 502/220 |
| 4,755,496 A | 7/1988 | Ho et al. ............ 502/165 |
| 4,792,541 A | 12/1988 | Ho et al. ............ 502/167 |
| 4,795,731 A | 1/1989 | Pecoraro et al. ............ 502/221 |
| 4,801,570 A | 1/1989 | Young et al. ............ 502/220 |
| 4,820,677 A | 4/1989 | Jacobson et al. ............ 502/220 |
| 4,824,820 A | 4/1989 | Jacobson et al. ............ 502/219 |
| 5,158,982 A | 10/1992 | Stapp ............ 521/41 |
| 5,186,818 A | 2/1993 | Daage et al. ............ 208/254 H |
| 5,332,489 A | 7/1994 | Veluswamy ............ 208/56 |
| 5,382,349 A | 1/1995 | Yoshita et al. ............ 208/49 |
| 5,484,755 A | 1/1996 | Lopez ............ 502/219 |
| 5,872,073 A | 2/1999 | Hilsenbeck et al. ............ 502/220 |
| 6,248,687 B1 | 6/2001 | Itoh et al. ............ 502/216 |
| 6,623,623 B2 | 9/2003 | Kalnes ............ 208/89 |
| 7,214,309 B2 | 5/2007 | Chen et al. ............ 208/111.3 |
| 7,238,273 B2 | 7/2007 | Chen et al. ............ 208/49 |
| 7,396,799 B2 | 7/2008 | Chen et al. ............ 502/216 |
| 7,402,547 B2 | 7/2008 | Wellington et al. ............ 502/222 |
| 7,410,928 B2 | 8/2008 | Chen et al. ............ 502/216 |
| 7,416,653 B2 | 8/2008 | Wellington et al. ............ 208/108 |
| 7,431,822 B2 | 10/2008 | Farshid et al. ............ 208/57 |
| 7,431,824 B2 | 10/2008 | Chen et al. ............ 208/108 |
| 7,431,831 B2 | 10/2008 | Farshid et al. ............ 208/423 |
| 7,763,160 B2 | 7/2010 | Wellington et al. ............ 208/14 |
| 7,811,445 B2 | 10/2010 | Wellington et al. ............ 208/14 |
| 7,828,958 B2 | 11/2010 | Wellington et al. ............ 208/14 |
| 7,854,833 B2 | 12/2010 | Wellington et al. ............ 208/108 |
| 7,879,223 B2 | 2/2011 | Wellington et al. |
| 2006/0058174 A1 | 3/2006 | Chen et al. ............ 502/3 |
| 2006/0157385 A1 | 7/2006 | Montanari et al. ............ 208/49 |
| 2007/0138055 A1 | 6/2007 | Farshid et al. ............ 208/49 |
| 2007/0138057 A1 | 6/2007 | Farshid et al. ............ 208/57 |
| 2007/0140927 A1 | 6/2007 | Reynolds ............ 422/140 |
| 2007/0238607 A1 | 10/2007 | Alonso et al. ............ 502/177 |

(Continued)

FOREIGN PATENT DOCUMENTS

| | | |
|---|---|---|
| CA | 1248514 | 1/1989 |
| EP | 0133031 | 2/1985 |

(Continued)

OTHER PUBLICATIONS

The Copper-Molybdenum Antagonism in Ruminants. III. Reaction of Copper(II) with Tetrathiomolybdate (VI), S. Laurie, D. Pratt, and J. B. Raynor, *Inorganic Chimica Acta*, vol. 123, pp. 193-196 (1986).

(Continued)

*Primary Examiner* — Melvin C Mayes
*Assistant Examiner* — Sheng H Davis

(57) ABSTRACT

A method for producing a thiometallate or selenometallate material is provided in which a first salt containing an anionic component selected from the group consisting of $MoS_4^{2-}$, $MoSe_4^{2-}$, $WS_4^{2-}$, $WSe_4^{2-}$ and a second salt containing a cationic component comprising copper in any non-zero oxidation state are mixed under anaerobic conditions in an aqueous mixture at a temperature of from 50° C. to 150° C.

21 Claims, No Drawings

U.S. PATENT DOCUMENTS

| | | | |
|---|---|---|---|
| 2008/0305947 A1 | 12/2008 | Chen et al. | 502/217 |
| 2009/0057193 A1 | 3/2009 | Farshid et al. | 208/56 |
| 2009/0057194 A1 | 3/2009 | Farshid et al. | 208/56 |
| 2009/0057195 A1 | 3/2009 | Powers et al. | 208/59 |

FOREIGN PATENT DOCUMENTS

| | | |
|---|---|---|
| EP | 0546686 | 6/1993 |
| FR | 2130297 | 3/1972 |
| GB | 630204 | 10/1949 |
| JP | H08199173 | 8/1996 |
| WO | WO2005082382 | 9/2005 |
| WO | WO2007059621 | 5/2007 |
| WO | WO2008014947 | 2/2008 |
| WO | WO2008141830 | 11/2008 |
| WO | WO2008141831 | 11/2008 |
| WO | WO2008151792 | 12/2008 |
| WO | WO2009003633 | 1/2009 |
| WO | WO2009003634 | 1/2009 |

OTHER PUBLICATIONS

Polymeric ternary metal thiols I. Products from reaction of Cu(II) with $MoS_4^{2-}$, T. Ecclestone, I. Harvey, S. Laurie, M. Symons, F. Taiwo, *Inorganic Chemical Communications*, vol. 1, pp. 460-462 (1998).

Thiomolybdates—Simple but Very Versatile Reagents, S. Laurie, *Eur. J. Inorg. Chem.*, pp. 2443-2450 (2000).

Hydrodenitrogenation-Selective Catalysts, T.C. Ho, A. Jacobson, R. Chianelli, C. Lund, *Journal of Catalysis*, vol. 138, pp. 351-363 (1992).

Synthesis of tetraalkylammonium thiometallate precursors and their concurrent in situ activation during hydrodesulfurization of dibenzothiophene, G. Alonzo et al., *Applied Catalysis A: General*, vol. 263, pp. 109-117 (2004).

Synthesis of tetraalkylammonium thiometallates in aqueous solution, G. Alonzo et al., *Inorganica Chimica Acta*, vol. 325, pp. 193-197 (2001).

Synthesis and Characterization of $Et_4N)_4[MoS_4Cu_{10}Cl_{12}]$: A Polynuclear Molybdenum-Copper Cluster Containing a Central Tetrahedral $MoS_4$ Encapsulated by Octahedral $Cu_6$ and Tetrahedral $Cu_4$ Arrays, Wu et al., *Inorg. Chem.*, vol. 35, pp. 1080-1082 (1996).

Preparation and Characterization of Cu(II), Zn(II) Sulfides Obtained by Spontaneous Precipitation in Electrolyte Solutions, D. Tsamouras et al., *Langmuir*, vol. 14, pp. 5298-5304 (1998).

Physicochemical Characteristics of Mixed Copper-Cadmium Sulfides Prepared by Coprecipitation, D. Tsamouras et al., *Langmuir*, vol. 15, pp. 8018-8024 (1999).

Properties of Cu(II) and Ni(II) Sulfides Prepared by Coprecipitation in Aqueous Solution, D. Tsamouras et al., *Langmuir*, vol. 15, pp. 7940-7946 (1999).

The synthesis and characterization of $Cu_2MX_4$ (M=W or Mo; X=S, Se or S/Se) materials prepared by a solvothermal method, C. Crossland, P. Hickey, & J. Evans, *Journal of Materials Chemistry*, vol. 15, pp. 3452-3458 (2005).

Mo(W,V)-Cu(Ag)-S(Se) Cluster Compounds, H-W. Hou, X-Q Xin, S. Shi, *Coordination Chemistry Reviews*, 153, pp. 25-56 (1996).

Molecular Architecture of Copper (I) Thiometallate Complexes, Example of a Cubane with an Extra Face, $(NPr_4)_3[MS_4Cu_4Cl_5]$ (M=Mo, W), Y. Jeannin, F. Secheresse, S. Bernes, and F. Robert, *Inorganica Chimica Acta*, 198-200 pp. 493-505 (1992).

The Build-Up of Bimetallic Transition Metal Clusters, P. R. Raithby, *Platinum Metals Review*, 42(4) pp. 146-157 (1998).

New Aspects of Heterometallic Copper (Silver) Cluster Compounds Involving Sulfido Ligands, X. Wu, Q. Huang, Q. Wang, T. Sheng, and J. Lu, *Chapter 17, Transition Metal Sulfer Chemistry*, pp. 282-296, American Chemical Society (1996).

Properties of Biological Copper, Molybdenum, and Nickel Compounds, D. Pratt, Thesis, Leicester Polytechnic School of Chemistry (1985).

A combined in situ X-ray absorption spectroscopy and X-ray diffraction study of the thermal decomposition of ammonium tetrathiotungstate, R. Walton and S. Hibble, *J. Mater. Chem.*, vol. 9, pp. 1347-1355 (1999).

Polymers of $[MS_4]^{2-}$ (M=Mo, W) With Cu(I) and Ag(I): Synthesis and Characterization of $[Me_4N][CuMS_4]$ and $[Me_4N][AgMS_4]$ and Their Polymeric Chain Breaking Reactions with M'CN (M'=Cu, Ag) to Form Cluster Complexes, A. B. M. Shamshur Rahman et al., *Journal of Bangladesh Academy of Sciences*, vol. 30, No. 2, pp. 203-212 (2006).

Synthesis and Characterization of Copper (I) Tetrathiomolybdates, V. Lakshmanan et al., *Indian Journal of Chemistry*, vol. 33A, pp. 772-774 (Aug. 1994).

Raman, Resonance Raman, and Infrared Spectroscopic Study of Complexes Containing Copper(I)-Tetrathio-Molybdate(VI) and —Tungstate(VI) Anions, Robin J. H. Clark et al., *J. Chem. Soc. Dalton Trans.*, pp. 1595-1601 (1986).

Complexes of $d^8$ Metals with Tetrathiomolybdate and Tetrathiotungstate Ions, Synthesis, Spectroscopy, and Electrochemistry, K. P. Callahan and P. A. Piliero, *Inorg. Chem.*, vol. 19, pp. 2619-2626 (1980).

Metal Sulfide Complexes and Clusters, D. Richard, G. Luther III, *Reviews in Mineralogy & Geochemistry*, vol. 61, pp. 421-504 (2006).

Properties of Some Solid Tetrathiomolybdates, G. M. Clark and W. P. Doyle, *J. Inorg. Nucl. Chem.*, vol. 28, pp. 281-385 (1966).

On the Preparation, Properties, and Structure of Cuprous Ammonium Thiomolybdate, W.P. Binnie, M.J. Redman, and W.J. Mallio, *Inorg. Chem.*, vol. 9, No. 6, pp. 1449-1452 (Jun. 1970).

Quasirelativistic Effects in the Electronic Structure of the Thiomolybdate and Thiotungstate Complexes of Nickel, Palladium, and Platinum, B.D. El-Issa and M.M. Zeedan, *Inorg. Chem.*, vol. 30, pp. 2594-2605 (1991).

Spongy chalcogels of non-platinum metals act as effective hydrodesulfurization catalysts, Santanu Bag et al., *Nature Chemistry*, DOI:10.1039/NCHEM.208, pp. 1-8 (Published Online www.nature.com: May 17, 2009).

Research on Soluble Metal Sulfides: From Polysulfido Complexes to Functional Models for the Hydrogenases, Thomas B. Rauchfuss, *Inorg. Chem.*, vol. 43, pp. 14-26 (2004).

PROCESS FOR PRODUCING A COPPER THIOMETALLATE OR A SELENOMETALLATE MATERIAL

CROSS REFERENCE TO RELATED APPLICATION

The present application claims the benefit of priority from U.S. Provisional Patent Application Ser. No. 61/297,054 file Jan. 21, 2010.

FIELD OF THE INVENTION

The present invention is directed to a process for producing a copper thiometallate or selenometallate material.

BACKGROUND OF THE INVENTION

Increasingly, resources such as heavy crude oils, tar sands, shale oils, and coal are being utilized as hydrocarbon sources due to decreasing availability of easily accessed light sweet crude oil reservoirs. These resources are disadvantaged relative to light sweet crude oils, often containing significant amounts of sulfur, nitrogen, metals, and heavy hydrocarbon fractions including residue and asphaltenes. The disadvantaged crudes typically require a considerable amount of upgrading in order to obtain useful hydrocarbon products therefrom.

Numerous catalysts have been developed for catalytically hydrocracking and hydrotreating disadvantaged hydrocarbon feedstocks. Typically, these catalysts contain a Group VIB or Group VIII metal supported on a carrier formed of alumina, silica, or alumina-silica. Such catalysts are commonly sulfided to activate the catalyst, either before contacting the catalyst with a disadvantaged hydrocarbon feed or in situ with the disadvantaged hydrocarbon feed.

Applicants have discovered that a copper thiometallate or selenometallate material is an exceptionally good catalyst for upgrading disadvantaged hydrocarbon feedstocks, particularly for converting all or substantially all heavy fractions such as residue and asphaltenes in the feedstock to lighter fractions while forming little or no coke. In particular, Applicants have discovered that copper tetrathiomolybdates and tetrathiotungstates and their tetraseleno-analogs are especially effective for hydrocracking disadvantaged hydrocarbon feedstocks to upgrade the feedstocks.

Ammonium and alkylammonium thiometallates have been used as precursors to produce metal sulfides. For example, tetralkylammonium thiomolybdate, tetralkylammonium thiotungstate, and ammonium thiomolybdate precursor compounds have been treated at temperatures of above 350° C. to thermally decompose the precursor compounds to produce $MoS_2$ and $WS_2$ disulfides having predicable stoichoimetry that have a high surface area and show substantial hydrodesulfurization and hydrodenitrogenation catalytic activity. Ammonium thiometallates have also been used as precursors to produce bimetallic compounds in an organic solvent. For example, copper thiometallates and copper selenometallates have been produced using a solvothermal method by reacting $(NH_4)_2MoS_4$, $(NH_4)_2WS_4$, $(PPh_4)_2MoSe_4$, or $(PPh_4)_2WSe_4$ with copper borofluoride salts in organic solvents at temperatures of 110° C. or above in an autoclave at autogenous pressures. Iron-molybdenum sulfide compounds have been produced by dissolving $(NH_4)_2MoS_4$ in an organic chelating solution of diethylenetriamine (dien) and slowly adding an iron salt in a 10% aqueous dien solution to precipitate a hydrodenitrogenation catalyst precursor. The precursor is thermally decomposed to remove organic ligand constituents and sulfactivate the catalyst. Such methods may be impractical for producing high yields of bimetallic or polymetallic thiometallates having a high surface area in a cost effective manner due to the temperatures, pressures, and solvents required, or due to the nature of the products themselves.

A method of preparing copper tetrathiomolybdates from ammonium tetrathiomolybdates and a copper salt is described in *The Copper-Molybdenum Antagonism in Ruminants. III. Reaction of Copper(II) with Tetrathiomolybdate (VI)*, Laurie, Pratt, & Raynor, *Inorganica Chimica Acta*, 123 (1986) 193-196. Aqueous solutions of reactants $CuSO_4.5H_2O$ and $M_2^I$—$MoS_4$ ($M^I$=$NH_4^+$, $Et_4N^+$, or $Na^+$) and $(NH_4)_2MoS_4$ were mixed to form a solid product which was collected by filtration, washed, and then dried. The solid product contained two materials, a composition $M^ICuMoS_4$ (where $M^I$ is the $M^I$ included in the tetrathiomolybdate reactant) and a composition $CuMoS_{4-x}O_x$, where x=2 or 3.

Improved processes are desirable for producing copper thiometallate or selenometallate materials.

SUMMARY OF THE INVENTION

The present invention is directed to a method for producing a thiometallate or selenometallate material, comprising mixing a first salt and a second salt in an aqueous mixture under anaerobic conditions, where, during mixing the aqueous mixture has a temperature of from 15° C. to 150° C., and wherein the first salt comprises a cationic component containing one or more metals selected from the group consisting of an alkali metal, an alkaline earth metal, and mixtures thereof and comprises an anionic component containing a metal selected from the group consisting of Mo and W where the anionic component is selected from the group consisting of $MoS_4^{2-}$, $MoSe_4^{2-}$, $WS_4^{2-}$, $WSe_4^{2-}$, and mixtures thereof, and wherein the second salt comprises a cationic component comprising copper in any non-zero oxidation state, where the first and second salts are soluble in the aqueous mixture; and separating a solid material from the aqueous mixture comprising a) the metal of the anionic component of the first salt; and b) the copper of the cationic component of the second salt, wherein at least a portion of the solid material separated from the aqueous mixture has a structure according to a formula selected from the group consisting of formula (I), formula (II), formula (III), and formula (IV):

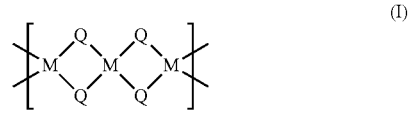

(I)

where M is either copper or the metal of the anionic component of the first salt; at least one M is copper and at least one M is the metal of the anionic component of the first salt; and Q is either sulfur or selenium;

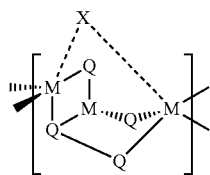
(II)

where M is either copper or the metal of the anionic component of the first salt, at least one M is copper and at least one M is the metal of the anionic component of the first salt, X is selected from the group consisting of $SO_4$, $PO_4$, oxalate ($C_2O_4$), acetylacetonate, acetate, citrate, tartrate, Cl, Br, I, $ClO_4$, $ClO_3$, and $NO_3$, and Q is either sulfur or selenium;

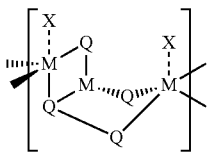
(III)

where M is either copper or the metal of the anionic component of the first salt, at least one M is copper and at least one M is the metal of the anionic component of the first salt, X is selected from the group consisting of $SO_4$, $PO_4$, oxalate ($C_2O_4$), acetylacetonate, acetate, citrate, tartrate, Cl, Br, I, $ClO_3$, $ClO_4$, and $NO_3$, and Q is either sulfur or selenium;

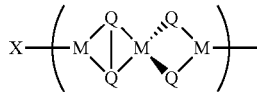
(IV)

where M is either copper or the metal of the anionic component of the first salt, at least one M is copper and at least one M is the metal of the anionic component of the first salt, X is selected from the group consisting of $SO_4$, $PO_4$, oxalate ($C_2O_4$), acetylacetonate, acetate, citrate, tartrate, Cl, Br, I, $ClO_3$, $ClO_4$, and $NO_3$, and Q is either sulfur or selenium.

In another aspect, the present invention is directed to a process for producing a thiometallate or selenometallate material, comprising: mixing a first salt and a second salt in an aqueous mixture under anaerobic conditions, where, during mixing the aqueous mixture has a temperature of from 15° C. to 150° C., and wherein the first salt comprises a cationic component containing one or more metals selected from the group consisting of an alkali metal, an alkaline earth metal, and mixtures thereof and comprises an anionic component containing a metal selected from the group consisting of Mo and W where the anionic component is selected from the group consisting of $MoS_4^{2-}$, $MoSe_4^{2-}$, $WS_4^{2-}$, $WSe_4^{2-}$, and mixtures thereof, and wherein the second salt comprises a cationic component comprising copper in any non-zero oxidation state, where the first and second salts are soluble in the aqueous mixture;

separating a solid material from the aqueous mixture comprising a) the metal of the anionic component of the first salt; and b) copper, where the solid material is comprised of at least three linked chain elements, the chain elements being comprised of a first chain element including copper and having a structure according to formula (V) and a second chain element including the metal of the anionic component of the first salt and having a structure according to formula (VI)

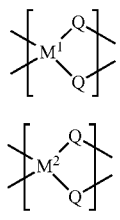

where $M^1$ is copper, where $M^2$ is the metal of the anionic component of the first salt, where Q is either sulfur or selenium, where the solid material contains at least one first chain element and at least one second chain element, and where at least a portion of the chain elements in the solid material are linked by bonds between the two sulfur atoms of a chain element or the two selenium atoms of a chain element and the metal of an adjacent chain element.

DETAILED DESCRIPTION OF THE INVENTION

The present invention is directed to a method for producing a copper thiometallate or a selenometallate material, in particular, a copper tetrathiometallate or a copper tetraselenometallate material. The method is conducted in an aqueous solution at low temperatures compared to thermal solvolysis methods, which typically are effected at temperatures above 150° C. As such, bulk quantities of the copper thiometallate or selenometallate materials may be easily produced at relatively low cost. The method produces a polymeric copper tetrathiometallate or tetraselenometallate material that may be substantially free of oxygen contaminants and contaminants derived from tetrathio- or tetraselenometallate salt counterions such as ammonium, sodium, or potassium. The method is also effective to produce significant quantities of the polymeric copper tetrathiometallate or tetraselenometallate material as small or nano particles having a large surface area that are effective as a catalyst for hydrocracking a heavy hydrocarbon feedstock.

As used herein, the phrase "anaerobic conditions" means "conditions in which less than 0.5 vol. % oxygen is present". For example, a process that occurs under anaerobic conditions, as used herein, is a process that occurs in the presence of less than 0.5 vol. % oxygen. Anaerobic conditions may be such that no detectable oxygen is present.

The term "aqueous" as used herein is defined as containing more than 50 vol. % water. For example, an aqueous solution or aqueous mixture, as used herein, contains more than 50 vol. % water.

"ASTM" Refers to American Standard Testing and Materials. The term "dispersible" as used herein with respect to mixing a solid, such as a salt, in a liquid is defined to mean that the components that form the solid, upon being mixed with the liquid, are retained in the liquid for a period of at least 24 hours upon cessation of mixing the solid with the liquid. A solid material is dispersible in a liquid if the solid or its components are soluble in the liquid. A solid material is also dispersible in a liquid if the solid or its components form a colloidal dispersion or a suspension in the liquid.

The term "ligand" as used herein is defined as a molecule or ion attached to, or capable of attaching to, a metal ion in a coordination complex.

The term "monomer" as used herein is defined as a molecular compound that may be reactively joined with itself or another monomer in repeated linked units to form a polymer.

The term "polymer" as used herein is defined herein as a compound comprised of repeated linked monomer units.

As used herein, an element of the Periodic Table of Elements may be referred to by its symbol in the Periodic Table. For example, Cu may be used to refer to copper, Mo may be used to refer to molybdenum, W may be used to refer to tungsten etc.

The term "soluble" as used herein refers to a substance a majority (at least 50 wt. %) of which dissolves in a liquid upon being mixed with the liquid at a specified temperature and pressure. For example, a material dispersed in a liquid is soluble in the liquid if less than 50 wt. % of the material may be recovered from the liquid by centrifugation and filtration.

In an embodiment of the process of the present invention, a first salt comprising an anionic component containing a metal and sulfur or selenium and a second salt comprising a cationic component containing copper are mixed in an aqueous mixture under anaerobic conditions at a temperature of from 15° C. to 150° C., and a solid material is separated from the aqueous mixture where the solid material comprises a) the metal of the anionic component of the first salt; and b) the copper of the cationic component of the second salt, wherein at least a portion of the solid material separated from the aqueous mixture has a structure according to a formula selected from the group consisting of formula (I), formula (II), formula (III), and formula (IV):

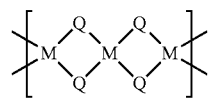

(I)

where M is either copper or the metal of the anionic component of the first salt; at least one M is copper and at least one M is the metal of the anionic component of the first salt; and Q is either sulfur or selenium;

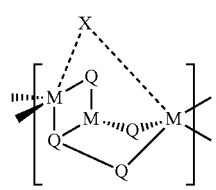

(II)

where M is either copper or the metal of the anionic component of the first salt, at least one M is copper and at least one M is the metal of the anionic component of the first salt, X is selected from the group consisting of $SO_4$, $PO_4$, oxalate ($C_2O_4$), acetylacetonate, acetate, citrate, tartrate, Cl, Br, I, $ClO_3$, $ClO_4$, and $NO_3$, and Q is either sulfur or selenium;

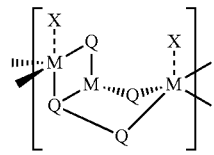

(III)

where M is either copper or the metal of the anionic component of the first salt, at least one M is copper and at least one M is the metal of the anionic component of the first salt, X is selected from the group consisting of $SO_4$, $PO_4$, oxalate ($C_2O_4$), acetylacetonate, acetate, citrate, tartrate, Cl, Br, I, $ClO_3$, $ClO_4$, and $NO_3$, and Q is either sulfur or selenium;

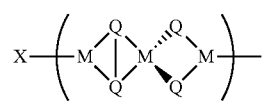

(IV)

where M is either copper or the metal of the anionic component of the first salt, at least one M is copper and at least one M is the metal of the anionic component of the first salt, X is selected from the group consisting of $SO_4$, $PO_4$, oxalate ($C_2O_4$), acetylacetonate, acetate, citrate, tartrate, Cl, Br, I, $ClO_3$, $ClO_4$, and $NO_3$, and Q is either sulfur or selenium.

In an another embodiment of the process of the present invention, a first salt comprising an anionic component containing a metal and sulfur or selenium and a second salt comprising a cationic component containing copper are mixed in an aqueous mixture under anaerobic conditions at a temperature of from 15° C. to 150° C., and a solid material is separated from the aqueous mixture where the solid material may be comprised of at least three linked chain elements, the chain elements being comprised of a first chain element including copper and having a structure according to formula (V) and a second chain element including the metal of the anionic component of the first salt and having a structure according to formula (VI)

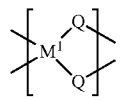

(V)

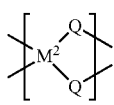

(VI)

where $M^1$ is copper, where $M^2$ is the metal of the anionic component of the first salt, and where Q is either sulfur or selenium, and where the solid material includes at least one first chain element and at least one second chain element. At least a portion of the chain elements in the solid material are linked by bonds between two sulfur atoms of a chain element and the metal of an adjacent chain element or by bonds between two selenium atoms of a chain element and a metal of an adjacent chain element.

The first salt utilized in the process of the present invention includes an anionic component that is a tetrathiometallate or a tetraselenometallate. In particular, the first salt contains an anionic component that is selected from the group consisting of $MoS_4^{2-}$, $MoSe_4^{2-}$, $WS_4^{2-}$, and $WSe_4^{2-}$.

The first salt also contains a cationic component associated with the anionic component of the first salt to form the first salt. The cationic component of the first salt may be selected from alkali metal and alkaline earth metal counterions to the tetrathiometallate or the tetraselenometallate anionic component of the first salt so long as the combined cationic component and the anionic component of the first salt form a salt that is dispersible, and preferably soluble, in the aqueous mixture in which the first salt and the second salt are mixed, and so long as the cationic component of the first salt does not prevent the combination of the anionic component of the first salt with the cationic component of the second salt in the aqueous mixture to form the solid product material. Preferably, the cationic component balances the charge of the anionic component in the first salt. In a preferred embodiment, the cationic component of the first salt comprises one or more sodium ions, or one or more potassium ions.

Certain compounds are preferred for use as the first salt in the process of the present invention. In particular, the first salt is preferably selected from the group consisting of $Na_2MoS_4$, $Na_2WS_4$, $Na_2MoSe_4$, $Na_2WSe_4$, $K_2MoS_4$, $K_2WS_4$, $K_2MoSe_4$, and $K_2WSe_4$.

The first salt may be produced from a commercially available tetrathiomolybdate or tetrathiotungstate salt. For example, the first salt may be produced from ammonium tetrathiomolybdate, which is commercially available from AAA Molybdenum Products, Inc. 7233 W. 116 Pl., Broomfield, Colo., USA 80020, or from ammonium tetrathiotungstate, which is commercially available from Sigma-Aldrich, 3050 Spruce St., St. Louis, Mo., USA 63103. The first salt may be formed from the commercially available ammonium tetrathiometallate salts by exchanging the ammonium component of the commercially available salt with a desired alkali or alkaline earth cationic component from a separate salt. The exchange of cationic components to form the desired first salt may be effected by mixing the commercially available salt and the salt containing the desired cationic component in an aqueous solution to form the desired first salt.

A preferred method of forming the first salt is to disperse an ammonium tetrathio- or tetraseleno-molybdate or tungstate in an aqueous solution, preferably water, and to disperse an alkali metal or alkaline earth metal cationic component donor salt, preferably a carbonate, in the aqueous solution, where the cationic component donor salt is provided in an amount relative to the ammonium tetrathio- or tetraseleno-molybdate or tungstate salt to provide a stoichiometrially equivalent or greater amount of its cation relative to ammonium of the ammonium tetrathio or tetraseleno-molybdate or tungstate salt. The aqueous solution may be heated to a temperature of at least 50° C., or at least 65° C. up to 100° C. to evolve ammonia from the ammonium containing salt and carbon dioxide from the carbonate containing salt as gases, and to form the first salt. For example a $Na_2MoS_4$ salt may be prepared for use as the first salt by mixing commercially available $(NH_4)_2MoS_4$ and $Na_2CO_3$ in water at a temperature of 70° C.-80° C. for a time period sufficient to permit evolution of a significant amount, preferably substantially all, of ammonia and carbon dioxide gases from the solution, typically from 30 minutes to 4 hours, and usually about 2 hours.

The first salt may be contained in an aqueous solution or an aqueous mixture, where, in the process of the present invention, the aqueous solution or aqueous mixture containing the first salt (hereinafter the "first aqueous solution") may be mixed with the second salt or an aqueous solution or aqueous mixture containing the second salt (hereinafter the "second aqueous solution") in the aqueous mixture to form the solid product material. The first salt is preferably dispersible, and most preferably soluble, in the first aqueous solution and is dispersible, and preferably soluble, in the aqueous mixture of the first and second salts. The first aqueous solution contains more than 50 vol. % water, or at least 75 vol. % water, or at least 90 vol. % water, or at least 95 vol. % water, and may contain more than 0 vol. % but less than 50 vol. %, or at most 25 vol. %, or at most 10 vol. %, or at most 5 vol. % of an organic solvent containing from 1 to 5 carbons selected from the group consisting of an alcohol, a diol, an aldehyde, a ketone, an amine, an amide, a furan, an ether, acetonitrile, and mixtures thereof. The organic solvent present in the first aqueous solution, if any, should be selected so that the organic compounds in the organic solvent do not inhibit reaction of the anionic component of the first salt with the cationic component of the second salt upon forming an aqueous mixture containing the first aqueous solution, e.g., by forming ligands or by reacting with the first or second salts or their respective cationic or anionic components. Preferably, the first aqueous solution contains no organic solvent. Most preferably the first aqueous solution consists essentially of water, most preferably deionized water, and the first salt, although in a less preferred embodiment the first aqueous solution may contain compounds other than the first salt, such as a buffer compound.

If the first salt is contained in a first aqueous solution, the concentration of the first salt in the first aqueous solution may be selected to promote formation of a solid product material having a particle size distribution with a small mean and/or median particle size and having a relatively large surface area per particle upon mixing the first salt and the second salt in the aqueous mixture. It has been found that decreasing the instantaneous concentration of the first salt and/or the second salt during mixing in the aqueous mixture produces a solid product material comprised of smaller particles relative to solid product materials produced from an aqueous mixture containing higher instantaneous concentrations of the first and second salts, where the smaller particles have a relatively large surface area. In an embodiment of the process of the invention, the first aqueous solution may contain at most 0.8 moles per liter, or at most 0.6 moles per liter, or at most 0.4 moles per liter, or at most 0.2 moles per liter, or at most 0.1 moles per liter of the first salt.

The second salt utilized in the process of the present invention includes a copper cationic component in any non-zero oxidation state. The cationic component of the second salt must be capable of bonding with the anionic component of the first salt to form the solid product material in the aqueous mixture at a temperature of from 15° C. to 150° C. and under anaerobic conditions.

The second salt also contains an anionic component associated with the cationic component of the second salt to form the second salt. The anionic component of the second salt may be selected from a wide range of counterions to the cationic component of the second salt so long as the combined cationic component and the anionic component of the second salt form a salt that is dispersible, and preferably soluble, in the aqueous mixture in which the first salt and the second salt are mixed, and so long as the anionic component of the second salt does not prevent the combination of the anionic component of the first salt with the cationic component of the second salt in the aqueous mixture to form the solid product material. The anionic component of the second salt may be selected from the group consisting of sulfate, chloride, bromide, iodide, acetate, acetylacetonate, phosphate, nitrate, chlorate, perchlorate, oxalate, citrate, and tartrate.

The anionic component of the second salt may associate with or be incorporated into a polymeric structure including the cationic component of the second salt and the anionic component of the first salt to form the material of the catalyst. For example, the anionic component of the second salt may complex with a polymeric structure formed of the cationic component of the second salt and the anionic component of the first salt as shown in formulas (VIII) and (IX) below, where X=the anionic component of the second salt, or may be incorporated into a polymeric structure including the cationic component of the second salt and the anionic component of the first salt as shown in formula (X) below, where X=the anionic component of the second salt.

Certain compounds are preferred for use as the second salt in the process of the present invention. In particular, the second salt is preferably copper sulfate, copper acetate, copper acetylacetonate, copper perchlorate, copper chlorate, copper bromide, copper nitrate, and copper chloride. These materials are generally commercially available, or may be prepared from commercially available materials according to well-known methods.

The second salt may be contained in an aqueous solution (the second aqueous solution, as noted above), where, in the process of the present invention, the second aqueous solution containing the second salt may be mixed with the first salt or a first aqueous solution containing the first salt in the aqueous mixture to form the solid product material. The second salt is preferably dispersible, and most preferably soluble, in the second aqueous solution and is dispersible, and preferably soluble, in the aqueous mixture containing the first and second salts. The second aqueous solution contains more than 50 vol. % water, or at least 75 vol. % water, or at least 90 vol. % water, or at least 95 vol. % water, and may contain more than 0 vol. % but less than 50 vol. %, or at most 25 vol. %, or at most 10 vol. %, or at most 5 vol. % of an organic solvent containing from 1 to 5 carbons and selected from the group consisting of an alcohol, a diol, an aldehyde, a ketone, an amine, an amide, a furan, an ether, acetonitrile, and mixtures thereof. The organic solvent present in the second aqueous solution, if any, should be selected so that the organic compounds in the organic solvent do not inhibit reaction of the anionic component of the first salt with the cationic component of the second salt upon forming an aqueous mixture containing the second aqueous solution, e.g., by forming ligands or by reacting with the first or second salts or their respective cationic or anionic components. Preferably, the second aqueous solution contains no organic solvent. Most preferably the second aqueous solution consists essentially of water, preferably deionized water, and the second salt, although in a less preferred embodiment the second aqueous solution may contain compounds other than the second salt, such as a buffer.

If the second salt is contained in a second aqueous solution, the concentration of the second salt in the second aqueous solution may be selected to promote formation of a solid product material having a particle size distribution with a small mean and/or median particle size, where the particles have a relatively large surface area, upon mixing the first salt and the second salt in the aqueous mixture. As noted above, it has been found that decreasing the instantaneous concentration of the first salt and/or the second salt during mixing in the aqueous mixture produces a solid product material comprised of smaller particles relative to solid product materials produced from an aqueous mixture containing higher instantaneous concentrations of the first and second salts, where the smaller particles have a relatively large surface area. In an embodiment of the process of the invention, the second aqueous solution may contain at most 3 moles per liter, or at most 2 moles per liter, or at most 1 mole per liter, or at most 0.6 moles per liter, or at most 0.2 moles per liter of the second salt.

In the process of the present invention, the first salt and the second salt are mixed in an aqueous mixture to form the solid product material. The amount of the first salt relative to the amount of the second salt provided to the aqueous mixture may be selected so that the atomic ratio of copper from the second salt to the metal of the anionic component of the first salt, either molybdenum or tungsten, is from 2:3 to 20:1, or from 1:1 to 10:1. The amount of the first salt and the second salt provided to the aqueous mixture may be selected so that the atomic ratio of copper from the second salt to the metal of the anionic component of the first salt is at least 1.5:1, or at least 1.6:1, or at least 2:1, or more than 2:1 since selection of a ratio of less than 1.5:1 may lead to incorporation of a small quantity of the cationic component of the first salt in the solid material product.

In one embodiment, an aqueous mixture of the first salt and the second salt may be formed by adding a solid form of the second salt to an aqueous solution containing the first salt (the first aqueous solution). Alternatively, the aqueous mixture of the first salt and the second salt may be formed by adding a solid form of the first salt to an aqueous solution containing the second salt (the second aqueous solution). In a further embodiment, the aqueous mixture of the first and second salts may be formed by combining a first aqueous solution containing the first salt and a second aqueous solution containing the second salt. If desired, water—preferably deionized—may be added to the aqueous mixture formed by any of these methods to dilute the aqueous mixture and reduce the concentrations of the first and second salts in the aqueous mixture.

In another embodiment of the process of the present invention, the aqueous mixture of the first and second salts may be formed by adding the first salt and the second salt into an aqueous solution separate from both a first aqueous solution containing the first salt and a second aqueous solution containing the second salt. The separate aqueous solution will be referred hereafter as the "third aqueous solution". The third aqueous solution contains more than 50 vol. % water, or at least 75 vol. % water, or at least 90 vol. % water, or at least 95 vol. % water, and may contain more than 0 vol. % but less than 50 vol. %, or at most 25 vol. %, or at most 10 vol. %, or at most 5 vol. % of an organic solvent containing from 1 to 5 carbons and selected from the group consisting of an alcohol, a diol, an aldehyde, a ketone, an amine, an amide, a furan, an ether, acetonitrile, and mixtures thereof. The organic solvent present in the third aqueous solution, if any, should be selected so that the organic compounds in the organic solvent do not inhibit reaction of the anionic component of the first salt with the copper cationic component of the second salt upon forming the aqueous mixture, e.g., by forming ligands or reacting with the anionic component of the first salt or with the copper cationic component of the second salt. Preferably, the third aqueous solution contains no organic solvent, and most preferably is comprised of deionized water.

In an embodiment of the process of the present invention, the first salt and the second salt may be added as solids to the third aqueous solution. Alternatively, either the first salt in a first aqueous solution or the second salt in a second aqueous solution may be added to the third aqueous solution while adding the other salt in solid form to form the aqueous mixture. If desired, water may be added to the aqueous mixture formed by any of these methods to dilute the aqueous mixture and reduce the concentrations of the first and second salts in the aqueous mixture.

In a preferred embodiment of the process of the present invention, the aqueous mixture of the first and second salts may be formed by combining a first aqueous solution containing the first salt and a second aqueous solution containing the second salt in a third aqueous solution. The volume ratio of the third aqueous solution to the first aqueous solution containing the first salt may be from 0.5:1 to 50:1 where the first aqueous solution preferably contains at most 0.8, or at most 0.4, or at most 0.2, or at most 0.1 moles of the first salt per liter of the first aqueous solution. Likewise, the volume ratio of the third aqueous solution to the second aqueous solution containing the second salt may be from 0.5:1 to 50:1 where the second aqueous solution preferably contains at most 3, or at most 2, or at most 1, or at most 0.8, or at most 0.5, or at most 0.3 moles of the second salt per liter of the second aqueous solution.

The first salt and the second salt may be combined in the aqueous mixture, regardless of which method is selected to combine the first and second salts, so that the aqueous mixture containing the first and second salts contains at most 1.5, or at most 1.2, or at most 1, or at most 0.8, or at most 0.6 moles of the combined first and second salts per liter of the aqueous mixture. It has been found that particle size of the solid material product produced by mixing the first and second salts in the aqueous mixture increases and the surface area of the particles decreases with increasing concentrations of the salts. Therefore, to limit the particle sizes in the particle size distribution of the solid material product and to increase the relative surface area of the particles, the aqueous mixture may contain at most 0.8 moles of the combined first and second salts per liter of the aqueous mixture, more preferably at most 0.6 moles, or at most 0.4 moles, or at most 0.2 moles of the combined first and second salts per liter of the aqueous mixture. The amount of first salt and the total volume of the aqueous mixture may be selected to provide at most 0.4, or at most 0.2, or at most 0.1, or at most 0.01 moles of the anionic component per liter of the aqueous mixture, and the amount of the second salt and the total volume of the aqueous mixture may be selected to provide at most 1, or at most 0.8, or at most 0.4 moles of the copper cationic component per liter of the aqueous mixture.

The rate of addition of the first salt and/or the second salt to the aqueous mixture may be controlled to limit the instantaneous concentration of the first salt and/or the second salt in the aqueous mixture to produce a solid product material comprised of relatively small particles having relatively large surface area Limiting the instantaneous concentration of one or both salts in the aqueous mixture may reduce the mean and/or median particle size of the resulting solid product material by limiting the simultaneous availability of large quantities of the anionic components of the first salt and large quantities of the copper cationic components of the second salt that may interact to form a solid product material comprised primarily of relatively large particles. In an embodiment of the process of the present invention, the rate of addition of the first salt and/or the second salt to the aqueous mixture is controlled to limit the instantaneous concentration of the first salt and/or the second salt in the aqueous mixture to at most 0.05 moles per liter, or at most 0.01 moles per liter, or at most 0.001 moles per liter.

The rate of addition of the first salt and/or the second salt to the aqueous mixture may be controlled by limiting the rate of addition of a first aqueous solution containing the first salt and/or the rate of addition of a second aqueous solution containing the second salt to the aqueous mixture. In one embodiment of the process of the present invention, the first aqueous solution containing the first salt may be added to the second aqueous solution containing the second salt, or the second aqueous solution may be added to the first aqueous solution, where the solution being added is added in a dropwise manner to the other solution. The rate of addition of drops of the first aqueous solution to the second aqueous solution or of drops of the second aqueous solution to the first aqueous solution may be controlled to provide the desired instantaneous concentration of the first salt or of the second salt in the aqueous mixture. In another embodiment, the first aqueous solution containing the first salt may be dispersed directly into the second aqueous solution containing the second salt at a controlled flow rate to provide a desired instantaneous concentration of the first salt in the aqueous mixture. Alternatively, the second aqueous solution containing the second salt may be dispersed directly into the first aqueous solution containing the first salt at a controlled flow rate selected to provide a desired instantaneous concentration of the second salt in the aqueous mixture. The first aqueous solution may be directly dispersed into the second aqueous solution or the second aqueous solution may be directly dispersed into the first aqueous solution at a selected controlled flow rate using conventional means for dispersing one solution into another solution at a controlled flow rate. For example, one solution may be dispersed through a nozzle located in the other solution, where the flow of the solution through the nozzle may be metered by a flow rate control device.

In a preferred embodiment, the first aqueous solution containing the first salt and the second aqueous solution containing the second salt are added to a third aqueous solution, preferably simultaneously, at a controlled rate selected to provide a desired instantaneous concentration of the first salt and the second salt in the aqueous mixture. The first aqueous solution containing the first salt and the second aqueous solution containing the second salt may be added to the third aqueous solution at a controlled rate by adding the first aqueous solution and the second aqueous solution to the third aqueous solution in a dropwise manner. The rate that drops of the first aqueous solution and the second aqueous solution are added to the third aqueous solution may be controlled to limit the instantaneous concentration of the first salt and the second salt in the aqueous mixture as desired. In a preferred embodiment, the first aqueous solution containing the first salt and the second aqueous solution containing the second salt are dispersed directly into the third aqueous solution at a flow rate selected to provide a desired instantaneous concentration of the first salt and the second salt. The first aqueous solution and the second aqueous solution may be dispersed directly into the third aqueous solution using conventional means for dispersing one solution into another solution at a controlled flow rate. For example, the first aqueous solution and the second aqueous solution may be dispersed into the third aqueous solution via separate nozzles located within the third aqueous solution, where the flow of the solutions to the nozzles may be metered by separate flow metering devices.

The particle size distribution of the solid material produced by mixing the first salt and the second salt in the aqueous mixture is preferably controlled by the rate of addition of the first salt and/or the second salt to the aqueous mixture, as described above, so that the median and/or mean particle size of the particle size distribution falls within a range of from 50 nm to 50 µm. In a preferred embodiment, the particle size distribution of the solid material is controlled by the rate of addition of the first and/or second salts to the aqueous mixture so that the median and/or mean particle size of the particle size distribution of the solid material may range from at least 50 nm up to 5 µm, or up to 1 µm, or up to 750 nm.

The surface area of the solid material particles produced by mixing the first salt and the second salt in the aqueous mixture is also preferably controlled by the rate of addition of the first salt and/or the second salt to the aqueous mixture, as described above, so that the BET surface area of the solid material particles is from 50 m$^2$/g to 500 m$^2$/g. In an embodiment, the surface area of the solid material particles is controlled by the rate of addition of the first salt and/or the second salt to the aqueous mixture so that the BET surface area of the solid material particles is from 100 m$^2$/g to 350 m$^2$/g The aqueous mixture contains more than 50 vol. % water, or at least 75 vol. % water, or at least 90 vol. % water, or at least 95 vol. % water, and may contain more than 0 vol. % but less than 50 vol. %, or at most 25 vol. %, or at most 10 vol. %, or at most 5 vol. % of an organic solvent containing from 1 to 5 carbons and selected from the group consisting of an alcohol, a diol, an aldehyde, a ketone, an amine, an amide, a furan, an ether, acetonitrile, and mixtures thereof. The organic solvent present in the aqueous mixture, if any, should not inhibit reaction of the anionic component of the first salt with the cationic component of the second salt. Preferably, the aqueous mixture contains no organic solvent.

The aqueous mixture containing the first salt and the second salt is mixed to facilitate interaction and reaction of the anionic component of the first salt with the cationic component of the second salt to form the solid product material. The aqueous mixture may be mixed by any conventional means for agitating a solution, for example by mechanical stirring.

During mixing, the temperature of the aqueous mixture is maintained in the range of from 15° C. to 150° C., or from 60° C. to 125° C., or most preferably from 65° C. to 100° C. In a preferred embodiment of the process of the present invention, the temperature of the aqueous mixture during mixing is maintained at less than 100° C. so that the mixing may be conducted without the application of positive pressure necessary to inhibit the water in the aqueous mixture from becoming steam.

Maintaining the temperature of the aqueous mixture in a range of from 50° C. to 150° C. may result in production of a solid material having a relatively large surface area and a substantially reduced median or mean particle size relative to a solid material produced in the same manner at a lower temperature. It is believed that maintaining the temperature in the range of 50° C. to 150° C. drives the reaction of the copper cationic component of the second salt with the anionic component of the first salt, reducing the reaction time and limiting the time available for the resulting product to agglomerate prior to precipitation. Maintaining the temperature in a range of from 50° C. to 150° C. during the mixing of the first and second salts in the aqueous mixture may result in production of a solid material having a particle size distribution with a median or mean particle size of from 50 nm up to 5 µm, or up to 1 µm, or up to 750 nm; and having a BET surface area of from 50 m$^2$/g up to 500 m$^2$/g or from 100 m$^2$/g to 350 m$^2$/g.

The aqueous mixture may be heated using any conventional means for heating a solution being mixed. For example, the aqueous mixture may be mixed in a jacketed mixing apparatus, where heat may be applied to the aqueous mixture by passing steam through the jacket of the mixing apparatus. If utilized, the first aqueous solution, second aqueous solution, and/or the third aqueous solution may be heated to a temperature within the desired range prior to forming the aqueous mixture by mixing the first and second salts.

The first and second salts in the aqueous mixture may be mixed under a pressure of from 0.101 MPa to 10 MPa (1.01 bar to 100 bar). Preferably, the first and second salts in the aqueous mixture are mixed at atmospheric pressure, however, if the mixing is effected at a temperature greater than 100° C. the mixing may be conducted under positive pressure to inhibit the formation of steam.

During mixing, the aqueous mixture is maintained under anaerobic conditions. Maintaining the aqueous mixture under anaerobic conditions during mixing inhibits the oxidation of the solid product material or the anionic component of the first salt so that the solid material product produced by the process contains little, if any oxygen, other than oxygen provided by the anionic component of the second salt, if any. The aqueous mixture may be maintained under anaerobic conditions during mixing by conducting the mixing in an atmosphere containing little or no oxygen, preferably an inert atmosphere. The mixing of the first and second salts in the aqueous mixture may be conducted under a nitrogen, argon, and/or steam to maintain anaerobic conditions during the mixing. In a preferred embodiment of the process of the present invention, an inert gas, preferably nitrogen or steam, is continuously injected into the aqueous mixture during mixing to maintain anaerobic conditions and to facilitate mixing of the first and second salts in the aqueous mixture.

The first and second salts are mixed in the aqueous mixture at a temperature of from 15° C. to 150° C. under anaerobic conditions for a period of time sufficient to permit the formation of solid material product comprised of a plurality of anionic components from the first salt and a plurality of copper cationic components from the second salt. The first and second salt may be mixed in the aqueous mixture for a period of at least 1 hour, or at least 2 hours, or at least 3 hours, or at least 4 hours, or from 1 hour to 10 hours, or from 2 hours to 9 hours, or from 3 hours to 8 hours, or from 4 hours to 7 hours to permit the formation of the solid material product. In an embodiment of the process of the invention, the first and/or second salt(s) may be added to the aqueous mixture over a period of from 30 minutes to 4 hours while mixing the aqueous mixture, and after the entirety of the first and second salts have been mixed into the aqueous mixture, the aqueous mixture may be mixed for at least an additional 1 hour, or 2 hours, or 3 hours or 4 hours, or 5 hours to permit the formation of the solid material product.

After completing mixing of the aqueous mixture of the first and second salts, a solid material is separated from the aqueous mixture, where the solid material may be comprised of a plurality of anionic components of the first salt and a plurality of copper cationic components from the second salt in which anionic components from the first salt in the solid material are bonded with at least a portion of the copper cationic components from the second salt in the solid material in two or more repeating units. The solid may be separated from the aqueous mixture by any conventional means for separating a solid phase material from a liquid phase material. For example, the solid may be separated by allowing the solid to settle from the resulting mixture, preferably for a period of from 1 hour to 16 hours, and separating the solid from the mixture by vacuum or gravitational filtration or by centrifugation. To enhance recovery of the solid, water may be added to the aqueous mixture prior to allowing the solid to settle. In an embodiment, water may be added to the aqueous mixture in a volume relative to the volume of the aqueous mixture of from 0.1:1 to 0.75:1. Alternatively, the solid material may be separated from the aqueous mixture by spray drying. Alternatively, but less preferably, the solid may be separated from the mixture by centrifugation without first allowing the solid to settle and/or without the addition of water.

The separated solid material product may be washed subsequent to separating the solid material from the aqueous mixture, if desired. The separated solid material may be contaminated with minor amounts, typically less than 0.5 wt. %, of the cationic component from the first salt and/or the anionic component from the second salt that are not incorporated into the molecular structure of the separated solid material. These minor contaminants may be removed from the separated solid material by washing the separated solid material with water. Substantial volumes of water may be used to wash the separated solid material since the separated solid material is insoluble in water, and the yield of solid material product will not be significantly affected by the wash.

The optionally washed separated solid material product may be dried, if desired. The separated solid material product may be dried by heating the solid material and/or by holding the solid material under vacuum. The solid material may be dried by heating to a temperature of from 35° C. to 75° C. under anaerobic conditions for a period of time sufficient to dry the solid material, typically from 12 hours to 5 days. The solid material may be dried by vacuum by holding the solid material under a vacuum for a period of from 12 hours to 5 days. Preferably the solid material is dried by heating to a temperature of from 35° C. to 75° C. under vacuum for a period of 2 to 4 days.

The solid material may be produced from the first and second salts in relatively good yield. The solid material may be produced at a yield of at least 45% up to 95%, or up to 90%, or up to 85% from the first and second salts.

The solid material separated from the aqueous mixture, optionally washed and/or optionally dried, is comprised of copper and the metal of the anionic component of the first salt, wherein at least a portion of the solid material separated from the aqueous mixture may have a structure according to a formula selected from the group consisting of formula (I), formula (II), formula (III), and formula (IV):

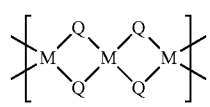
(I)

where M is either copper or the metal of the anionic component of the first salt; at least one M is copper and at least one M is the metal of the anionic component of the first salt; and Q is either sulfur or selenium;

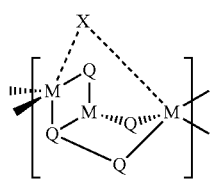
(II)

where M is either copper or the metal of the anionic component of the first salt, at least one M is copper and at least one M is the metal of the anionic component of the first salt, X is selected from the group consisting of $SO_4$, $PO_4$, oxalate ($C_2O_4$), acetylacetonate, acetate, citrate, tartrate, Cl, Br, I, $ClO_4$, $ClO_3$, and $NO_3$, and Q is either sulfur or selenium;

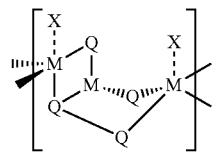
(III)

where M is either copper or the metal of the anionic component of the first salt, at least one M is copper and at least one M is the metal of the anionic component of the first salt, X is selected from the group consisting of $SO_4$, $PO_4$, oxalate ($C_2O_4$), acetylacetonate, acetate, citrate, tartrate, Cl, Br, I, $ClO_3$, $ClO_4$, and $NO_3$, and Q is either sulfur or selenium;

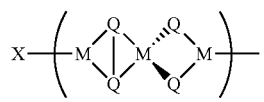
(IV)

where M is either copper or the metal of the anionic component of the first salt, at least one M is copper and at least one M is the metal of the anionic component of the first salt, X is selected from the group consisting of $SO_4$, $PO_4$, oxalate ($C_2O_4$), acetylacetonate, acetate, citrate, tartrate, Cl, Br, I, $ClO_3$, $ClO_4$, and $NO_3$, and Q is either sulfur or selenium.

The solid material separated from the aqueous mixture may also be comprised of at least three linked chain elements, the chain elements being comprised of a first chain element including copper and having a structure according to formula (V) and a second chain element including the metal of the anionic component of the first salt and having a structure according to formula (VI)

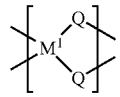
(V)

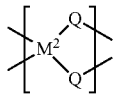
(VI)

where $M^1$ is copper, where $M^2$ is the metal of the anionic component of the first salt, and where Q is either sulfur or selenium, and where the solid material includes at least one first chain element and at least one second chain element. At least a portion of the chain elements in the solid material are linked by bonds between two sulfur atoms of a chain element and the metal of an adjacent chain element or by bonds between two selenium atoms of a chain element and a metal of an adjacent chain element.

The solid material produced by separation from the aqueous mixture may be comprised of a plurality of anionic components of the first salt and a plurality of copper cationic components from the second salt in which anionic components from the first salt in the solid material are bonded with at least a portion of the copper cationic components from the second salt in the solid material in two or more repeating units. The solid material product may be comprised of alternating atoms of the metal of the anionic component of the first salt and the copper cationic component of the second salt bonded to and linked by two sulfur atoms or two selenium atoms. The solid material may comprise alternating $M^1S_4$ and $M^2S_4$ tetrahedral formations or alternating $M^1Se_4$ and $M^2Se_4$ tetrahedral formations, where each tetrahedral formation shares at least two sulfur atoms or at least two selenium atoms with an adjacent tetrahedral formation, and where $M^1$ is copper from the cationic component of the second salt and $M^2$ is the metal from the anionic component of the first salt.

In an embodiment of the present invention, the solid material separated from the aqueous mixture is a polythiometallate or polyselenometallate polymer. The solid material polymer may be comprised of units having a structure according to a formula selected from the group consisting of formula (VII), formula (VIII), formula (IX), and formula (X):

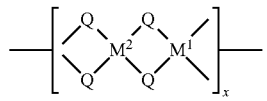
(VII)

where $M^1$ is copper, $M^2$ is the metal of the anionic component of the first salt, Q is either sulfur or selenium, and x is at least 5;

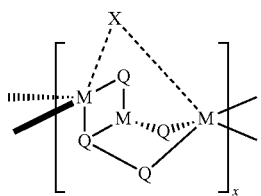
(VIII)

where M is either copper or the metal of the anionic component of the first salt, at least one M is copper and at least one M is the metal of the anionic component of the first salt, X is selected from the group consisting of $SO_4$, $PO_4$, oxalate ($C_2O_4$), acetylacetonate, acetate, citrate, tartrate, Cl, Br, I, $ClO_3$, $ClO_4$, and $NO_3$, Q is either sulfur or selenium, and x is at least 5;

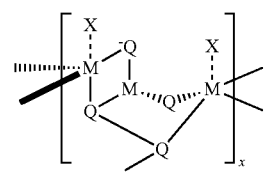
(IX)

where M is either copper or the metal of the anionic component of the first salt, and at least one M is copper and at least one M is the metal of the anionic component of the first salt, X is selected from the group consisting of $SO_4$, $PO_4$, oxalate ($C_2O_4$), acetylacetonate, acetate, citrate, tartrate, Cl, Br, I, $ClO_3$, $ClO_4$, and $NO_3$, Q is either sulfur or selenium, and x is at least 5; and

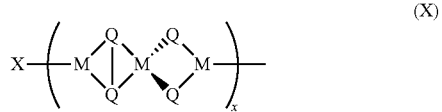
(X)

where M is either copper or the metal of the anionic component of the first salt, and at least one M is copper and at least one M is the metal of the anionic component of the first salt, X is selected from the group consisting of $SO_4$, $PO_4$, oxalate ($C_2O_4$), acetylacetonate, acetate, citrate, tartrate, Cl, Br, I, $ClO_3$, $ClO_4$, and $NO_3$, Q is either sulfur or selenium, and x is at least 5.

Furthermore, the solid material separated from the aqueous mixture may have a two-dimensional or a three-dimensional polymeric structure with alternating metal centers of the copper from the second salt and the metal of the anionic component from the first salt bridged by two sulfur atoms or by two selenium atoms. The two- and/or three-dimensional polymeric structure of a solid product material produced hereby may have "holes" in its structure, in which a copper cationic component from the second salt is missing as an alternating metal center. The two- and/or three-dimensional polymeric structure may contain a portion of the copper cationic component of the second salt within interstices in the polymeric structure or in holes in the polymeric structure, where the portion of the copper cationic component of the second salt located in the interstices or holes in the polymeric structure are not bonded with an anionic component from the first salt that forms a part of the polymeric structure and/or are not bonded with a sulfur atom or a selenium atom included in the polymeric structure.

The solid material separated from the aqueous mixture is typically at least partially crystalline Crystallinity of the solid material may be determined by x-ray powder diffraction. The solid material product may be from 15% to 100% crystalline, or from 25% to 99% crystalline, of from 35% to 95% crystalline, or at least 20% crystalline, or at least 30% crystalline, or at least 40% crystalline, or at least 50% crystalline, or at least 60% crystalline, or at least 70% crystalline, or at least 75% crystalline. The solid material typically has a tetrahedral crystalline structure. The solid material also typically comprises alternating $M'S_4$ and $CuS_4$ tetrahedral formations or $M^1Se_4$ and $CuSe_4$ tetrahedral formations, where each tetrahedral formation shares two sulfur atoms or two selenium atoms with an adjacent tetrahedral formation, and where $M'$ is the metal of the anionic component of the first salt.

The solid material separated from the aqueous mixture may comprise at most 0.1 wt. %, or at most 0.05 wt. %, or at most 0.01 wt. % oxygen. The oxygen content of the solid material may be measured by neutron activation, for example as determined in accordance with ASTM Method E385. In a preferred embodiment, oxygen is not detectable in the solid material.

The solid material separated from the aqueous mixture may contain at most 0.5 wt. %, or at most 0.1 wt. %, or at most 0.01 wt. % of the cationic component of the first salt. The cationic content of the first salt included in the solid material may be measured by x-ray fluorescence. The cationic component of the first salt may be an undesirable contaminant in the solid material. In an embodiment of the process of the present invention, the copper cationic component of the second salt is utilized in an atomic ratio to the metal of the anionic component of the first salt of greater than 1.5:1, or at least 1.6:1, or at least 2:1, or greater than 2:1 to ensure that the solid material contains less than 0.5 wt. % of the cationic component of the first salt. It is believed that the cationic component of the first salt may become included in the solid material if insufficient copper cationic component of the second salt is present to counterbalance the charge of the anionic component of the first salt upon formation of the solid material, therefore, sufficient copper cationic component of the second salt may be provided to reduce or eliminate the presence of the cationic component of the first salt in the solid material.

In an embodiment, the solid material separated from the aqueous mixture may contain less than 0.5 wt. % of ligands other than the sulfur-metal bonded complexes or selenium-metal complexes between sulfur or selenium and the copper cationic component from the second salt and between sulfur or selenium and the metal of the anionic component from the first salt that form the structure of the solid material.

The solid material separated from the aqueous mixture may be particulate, and may have a particle size distribution. The particle size distribution may have a median and/or mean particle size of from 50 nm to 50 μm, or from 75 nm to 10 μm, or from 100 nm to 1 μm, most preferably from 50 nm to 1 nm. In an embodiment of the invention, the solid material product may have a particle size distribution with a mean and/or median particle size of from 50 nm up to 5 nm, or up to 1 μm, or up to 750 nm.

It is preferable that the solid material separated from the aqueous mixture have a particle size distribution with a mean and/or median particle size of at least 50 nm so that the solid material may be utilized to hydrocrack and/or hydrotreat a heavy crude oil and be easily separated from the hydrocarbon feedstock, hydrocarbon product, and/or a byproduct stream. If the solid material has a mean and/or median particle size less than 50 nm, the solid material product may be soluble in the hydrocarbon feedstock, product, and/or byproduct stream, rendering the solid material catalyst difficult to separate from hydrocarbon feedstock, product, and/or byproduct stream.

It is further preferable that the solid material have a particle size distribution having a mean and/or median particle size of at most 5 μm, more preferably of at most 1 μm, so that the solid material will have a relatively large surface area. A relatively large surface area is desirable when the solid material is used as a catalyst in hydrocracking and/or hydrotreating a hydrocarbon feedstock to provide high catalytic activity. The solid material particles may have a mean BET surface area of from 50 $m^2/g$ to 500 $m^2/g$, or from 100 $m^2/g$ to 350 $m^2/g$.

To facilitate a better understanding of the present invention, the following example is given. In no way should the following example be read to limit, or define, the scope of the invention.

Example 1

A solid material product containing copper-molybdenum-sulfur was produced according to a process in accordance with the present invention, using sodium as a counterion to $MoS_4^{2-}$. $Na_2MoS_4$ was produced from $(NH_4)_2MoS_4$ by heating a solution formed of 130 g $(NH_4)_2MoS_4$ dissolved in 11.3 liters of deionized water to a temperature of 60° C., adding 500 ml of an aqueous solution containing 106 g of $Na_2CO_3$ dropwise to the $(NH_4)_2MoS_4$ solution over a period of 2 hours while stirring and maintaining the temperature of the mixture at 60° C., then continuing stiffing at 60° C. for 3.5 hours after addition of the $Na_2CO_3$ solution was completed. The resulting solution was cooled to room temperature overnight to provide a solution of $Na_2MoS_4$.

2.5 liters of deionized water was added to the solution of $Na_2MoS_4$, and the solution was heated to 80-83° C. A solution of $CuSO_4$ was prepared by dissolving 300 g of $CuSO_4$ in 0.5 liters of deionized water. The $CuSO_4$ solution was transferred to the heated solution of $Na_2MoS_4$ via a ¼" Teflon tube line having a 2"×0.02" nozzle driven by an air driven gear pump while the mixture was stirred under a nitrogen atmosphere and the temperature of the mixture was maintained at 80-83° C. Transfer of the $CuSO_4$ solution took 1 hour. The mixture was stirred and maintained under nitrogen at a temperature of 80-83° C. for an additional 3-5 hours after transfer of the $CuSO_4$ solution was completed. The resulting blood-red slurry was allowed to cool to room temperature and to settle overnight while holding the slurry under nitrogen. A solid product material was separated from the mixture by centrifugation at 12000 G. The solid material product was dried under reduced vacuum pressure and a temperature of less than 30° C. 54 g of a solid product material was recovered. X-ray fluorometry showed that the solid material product contained, on a mass % basis, 32.1% Cu, 27.5% Mo, and 40% S. X-ray diffraction and Raman IR spectroscopy showed that at least a portion of the solid material had a structure in which copper, sulfur, and molybdenum were arranged as shown in Formula (XI):

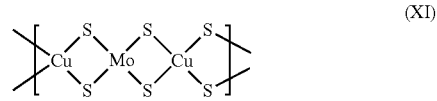 (XI)

The solid material had a particle size distribution, as set forth in Table 1:

TABLE 1

| Particle size (μm) | Volume % |
|---|---|
| <1.03 | 0 |
| 1.03 | 0.1 |
| 1.14 | 0.03 |
| 1.26 | 0.07 |
| 1.39 | 0.14 |
| 1.53 | 0.30 |
| 1.69 | 0.50 |
| 1.86 | 0.69 |
| 2.05 | 1.02 |
| 2.26 | 1.57 |
| 2.49 | 2.17 |
| 2.75 | 2.91 |
| 3.03 | 3.96 |
| 3.34 | 5.17 |
| 3.69 | 6.43 |
| 4.07 | 7.71 |
| 4.48 | 8.79 |
| 4.94 | 9.61 |
| 5.45 | 10.26 |
| 6.01 | 9.98 |
| 6.63 | 8.38 |
| 7.31 | 6.80 |
| 8.06 | 5.28 |
| 8.89 | 3.57 |
| 9.80 | 2.25 |
| 10.81 | 1.40 |
| 11.91 | 0.78 |
| 13.14 | 0.22 |
| >14.49 | 0 |

The particle size distribution had a mean particle size of 5.39 μm. The BET surface area of the particulate solid material product was determined to be 113 $m^2/g$.

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. Whenever a numerical range with a lower limit and an upper limit is disclosed, any number and any included range falling within the range is specifically disclosed. In particular, every range of values (of the form, "from a to b," or, equivalently, "from a-b") disclosed herein is to be understood to set forth every number and range encompassed within the broader range of values. Whenever a numerical range having a specific lower limit only, a specific upper limit only, or a specific upper limit and a specific lower limit is disclosed, the range also includes any numerical value "about" the specified lower limit and/or the specified upper limit Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces.

We claim:

1. A method for producing a thiometallate or selenometallate material, comprising:
   mixing a first salt and a second salt in an aqueous mixture under anaerobic conditions, where, during mixing the aqueous mixture has a temperature of from 15° C. to 150° C., and wherein the first salt comprises a cationic component containing one or more metals selected from the group consisting of an alkali metal, an alkaline earth metal, and mixtures thereof and comprises an anionic component containing a metal selected from the group consisting of Mo and W where the anionic component is selected from the group consisting of $MoS_4^{2-}$, $MoSe_4^{2-}$, $WS_4^{2-}$, $WSe_4^{2-}$, and mixtures thereof, and wherein the second salt comprises a cationic component comprising copper in any non-zero oxidation state, where the first and second salts are soluble in the aqueous mixture;
   separating a solid material from the aqueous mixture comprising a) the metal of the anionic component of the first salt; and b) copper, wherein at least a portion of the solid material separated from the aqueous mixture has a structure according to a formula selected from the group consisting of formula (I), formula (II), formula (III), and formula (IV):

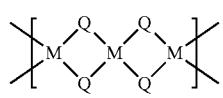
(I)

where M is either copper or the metal of the anionic component of the first salt; at least one M is copper and at least one M is the metal of the anionic component of the first salt; and Q is either sulfur or selenium;

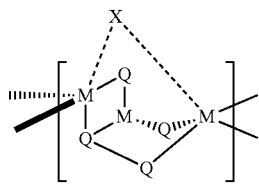
(II)

where M is either copper or the metal of the anionic component of the first salt, at least one M is copper and at least one M is the metal of the anionic component of the first salt, X is selected from the group consisting of $SO_4$, $PO_4$, oxalate ($C_2O_4$), acetylacetonate, acetate, citrate, tartrate, Cl, Br, I, $ClO_4$, $ClO_3$, and $NO_3$, and Q is either sulfur or selenium;

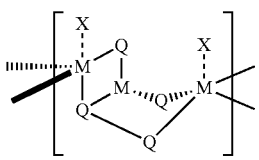
(III)

where M is either copper or the metal of the anionic component of the first salt, at least one M is copper and at least one M is the metal of the anionic component of the first salt, X is selected from the group consisting of $SO_4$, $PO_4$, oxalate ($C_2O_4$), acetylacetonate, acetate, citrate, tartrate, Cl, Br, I, $ClO_3$, $ClO_4$, and $NO_3$, and Q is either sulfur or selenium;

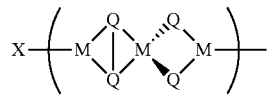
(IV)

where M is either copper or the metal of the anionic component of the first salt, at least one M is copper and at least one M is the metal of the anionic component of the first salt, X is selected from the group consisting of $SO_4$, $PO_4$, oxalate ($C_2O_4$), acetylacetonate, acetate, citrate, tartrate, Cl, Br, I, $ClO_3$, $ClO_4$, and $NO_3$, and Q is either sulfur or selenium.

2. The method of claim 1 wherein the solid material separated from the aqueous mixture contains at most 0.5 wt. % of the cationic component of the first salt and contains at most 0.5 wt. % oxygen.

3. The method of claim 1 wherein the amount of the first salt and the amount of the second salt mixed in the aqueous mixture are selected to provide an atomic ratio of the cationic component of the second salt to the molybdenum or tungsten of the anionic component of the first salt of greater than 1.6:1.

4. The method of claim 1 wherein the amount of the first salt and the total volume of the aqueous mixture are selected to provide at most 0.2 moles of the anionic component from the first salt per liter of the total volume of the aqueous mixture, and where the amount of the second salt and the total volume of the aqueous mixture are selected to provide at most 1 mole of the cationic component of the second salt per liter of the total volume of the aqueous mixture.

5. The method of claim 1 wherein the first salt is contained in a first aqueous solution and the second salt is contained in a second aqueous solution, and the first salt and the second salt are mixed in the aqueous mixture by mixing the first aqueous solution and the second aqueous solution.

6. The method of claim 5 wherein the first aqueous solution containing the first salt and the second aqueous solution containing the second salt are added to a third aqueous solution to form the aqueous mixture.

7. The method of claim 6 wherein the volume ratio of the third aqueous solution to the first aqueous solution is from 0.5:1 to 50:1 where the first aqueous solution contains at most 0.8 moles per liter of the first salt and the volume ratio of the third aqueous solution to the second aqueous solution is from 0.5:1 to 50:1 where the second aqueous solution contains at most 3 moles per liter of the second salt.

8. The method of claim 6 where the first aqueous solution and the second aqueous solution are added to the third aqueous solution and mixed in the third aqueous solution such that the instantaneous concentration of the first salt in the aqueous mixture is at most 0.05 moles per liter and such that the instantaneous concentration of the second salt in the aqueous mixture is at most 0.05 moles per liter.

9. The method of claim 5 further comprising the step of forming the first aqueous solution containing the first salt by mixing a salt comprising an alkali metal carbonate or an alkaline earth metal carbonate and an aqueous solution containing a salt selected from the group consisting of $(NH_4)_2MoS_4$, $(NH_4)_2MoSe_4$, $(NH_4)_2WS_4$, $(NH_4)_2WSe_4$, and mixtures thereof at a temperature of from 50° C. to 150° C. under anaerobic conditions, and degassing ammonia gas and carbon dioxide formed during the mixing from the aqueous solution.

10. The method of claim 1 wherein the solid material separated from the aqueous mixture is particulate and has a particle size distribution, where the mean particle size or the median particle size of the particle size distribution of the solid material is from 50 nm to 100 μm.

11. The method of claim 1 wherein the solid material separated from the aqueous mixture is particulate where the particles have an average BET surface area of from 50 m²/g to 500 m²/g.

12. The method of claim 1 wherein the solid material is at least 20% crystalline.

13. The method of claim 1 wherein the aqueous mixture contains more than 0 vol. % but less than 50 vol. % of an organic solvent containing from 1 to 5 carbons and selected from the group consisting of an alcohol, a diol, an aldehyde, a ketone, an amine, an amide, a furan, an ether, acetonitrile, and mixtures thereof where the first salt and the second salt are soluble in the aqueous mixture.

14. The method of claim 1 wherein the solid material comprises alternating $M^1S_4$ and $M^2S_4$ tetrahedral formations, where each tetrahedral formation shares two sulfur atoms with an adjacent tetrahedral formation, and where $M^1$ is copper and $M^2$ is either molybdenum or tungsten.

15. The method of claim 1 wherein the solid material separated from the aqueous mixture is comprised of alternating atoms of the metal of the anionic component of the first salt and copper atoms bonded to and linked by two sulfur atoms.

16. The method of claim 1 wherein the solid material separated from the aqueous mixture is comprised of copper and the metal of the anionic component of the first salt, where the solid material is comprised of at least three linked chain elements, the chain elements being comprised of a first chain element including copper and having a structure according to formula (V) and a second chain element including the metal of the anionic component of the first salt and having a structure according to formula (VI)

where $M^1$ is copper, where $M^2$ is the metal of the anionic component of the first salt, where Q is either sulfur or selenium, where the solid material contains at least one first chain element and at least one second chain element, and where at least a portion of the chain elements in the solid material are linked by bonds between the two sulfur atoms of a chain element or the two selenium atoms of a chain element and the metal of an adjacent chain element.

17. The method of claim 1 wherein the solid material separated from the aqueous mixture is a polymer having a structure according to a formula selected from the group consisting of formula (VII), formula (VIII), formula (IX), and formula (X):

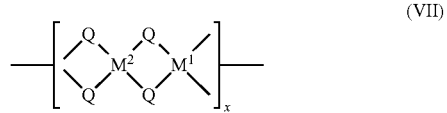

where $M^1$ is copper, $M^2$ is the metal of the anionic component of the first salt, Q is either sulfur or selenium, and x is at least 5;

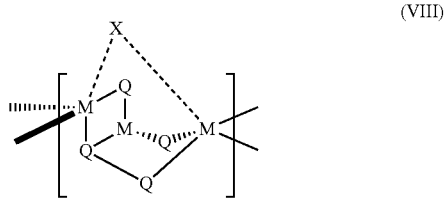

where M is either copper or the metal of the anionic component of the first salt, at least one M is copper and at least one M is the metal of the anionic component of the first salt, X is selected from the group consisting of $SO_4$, $PO_4$, oxalate $(C_2O_4)$, acetylacetonate, acetate, citrate, tartrate, Cl, Br, I, $ClO_3$, $ClO_4$, and $NO_3$, Q is either sulfur or selenium, and x is at least 5,

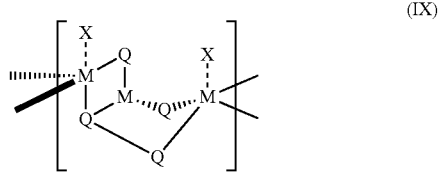

where M is either copper or the metal of the anionic component of the first salt, and at least one M is copper and at least one M is the metal of the anionic component of the first salt, X is selected from the group consisting of $SO_4$, $PO_4$, oxalate ($C_2O_4$), acetylacetonate, acetate, citrate, tartrate, Cl, Br, I, $ClO_3$, $ClO_4$, and $NO_3$, Q is either sulfur or selenium, and x is at least 5; and

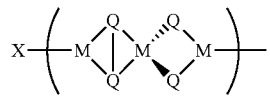 (X)

where M is either copper or the metal of the anionic component of the first salt, and at least one M is copper and at least one M is the metal of the anionic component of the first salt, X is selected from the group consisting of $SO_4$, $PO_4$, oxalate ($C_2O_4$), acetylacetonate, acetate, citrate, tartrate, Cl, Br, I, $ClO_3$, $ClO_4$, and $NO_3$, Q is either sulfur or selenium, and x is at least 5.

18. The method of claim 1 wherein the solid material separated from the aqueous mixture contains less than 0.5 wt. % of ligands other than the sulfur-metal bonded complexes between sulfur and copper and between sulfur and the metal of the anionic component from the first metal.

19. The method of claim 1 further comprising the step of washing the solid material with water subsequent to separation of the solid material from the aqueous mixture.

20. The method of claim 1 further comprising the step of drying the separated solid material.

21. The method of claim 1 wherein the solid material separated from the aqueous mixture is comprised of a plurality of anionic components from the first salt and a plurality of cationic components from the second salt where the anionic components from the first salt are bonded with at least a portion of the cationic components from the second salt in two or more repeating units.

* * * * *